United States Patent
Hel-or et al.

(10) Patent No.: US 6,404,918 B1
(45) Date of Patent: Jun. 11, 2002

(54) IMAGE DEMOSAICING METHOD UTILIZING DIRECTIONAL SMOOTHING

(75) Inventors: Yacov Hel-or, Mevasseret-Zion; Daniel Keren, Kirvat-Tivon, both of (IL)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/303,772

(22) Filed: Apr. 30, 1999

(51) Int. Cl.[7] .................................................. G06K 9/00
(52) U.S. Cl. ........................ 382/167; 348/273; 358/518; 358/525; 382/260
(58) Field of Search ................................. 382/162, 166, 382/167, 300, 260–266, 254, 268, 219, 274, 275; 358/518–521, 512, 513, 525; 348/234, 272, 273, 280, 607, 625; 345/589, 590

(56) References Cited

U.S. PATENT DOCUMENTS

| | | | |
|---|---|---|---|
| 5,373,322 A | | 12/1994 | Laroche et al. ............. 348/273 |
| 5,631,703 A | * | 5/1997 | Hamilton, Jr. et al. ...... 348/273 |
| 5,990,950 A | * | 11/1999 | Addison ..................... 348/273 |
| 6,130,960 A | * | 10/2000 | Acharya ..................... 382/167 |
| 6,229,578 B1 | * | 5/2001 | Acharya et al. ............ 348/607 |
| 6,236,433 B1 | * | 5/2001 | Acharya et al. ............ 348/273 |
| 6,269,181 B1 | * | 7/2001 | Acharya ..................... 382/162 |

\* cited by examiner

Primary Examiner—Bhavesh Mehta

(57) ABSTRACT

A method for operating a data processing system to generate a full color image from a partially sampled version of the image. The full color image includes a first two-dimensional array of vectors having components representing the intensity of a pixel in the full color image in a corresponding spectral band at a location determined by the location of the vector in the first two-dimensional array. The method generates the first two-dimensional array from a two-dimensional array of scalars. Each scalar determines one of the first, second, or third intensity values at a corresponding location in the two-dimensional array of vectors. The method determines the remaining ones of the first, second, and third intensity values. The method starts by assigning a value to each one of the components of the vectors in the first two-dimensional array of vectors that is not determined by one of the scalars. A luminance image and first and second chrominance images are then generated from the first two-dimensional array of vectors. The chrominance images are filtered with an isotropic low-pass spatial filter to generate filtered chrominance images. The two-dimensional array of vectors is then regenerated from the luminance image and the first and second filtered chrominance images. The scalars that are originally given by the sensors are reset in the regenerated two-dimensional array of vectors. The decomposition, filtering, resetting, and regenerating steps are iterated to provide the final full-color image. In the preferred embodiment, the luminance image is also filtered. However, the filtering of the luminance image utilizes a low-pass spatial filter having an anisotropy that varies with location in the luminance image.

5 Claims, 3 Drawing Sheets

IMAGE DEMOSAICING METHOD UTILIZING DIRECTIONAL SMOOTHING

FIELD OF THE INVENTION

The present invention relates to digital cameras and similar devices, and more particularly, to an improved method for converting data from a camera sensor to a color image.

BACKGROUND OF THE INVENTION

A digital color image usually consists of an array of pixel values representing the intensity of the image at each point on a regular grid. Typically, three colors are used to generate the image. At each point on the grid the intensity of each of these colors is specified, thereby specifying both the intensity and color of the image at that grid point.

Conventional color photography records the relevant image data by utilizing three overlapping color sensing layers having sensitivities in different regions of the spectrum (usually red, green, and blue). Digital cameras and scanners, in contrast, typically utilize one array of sensors in a single "layer".

When only one sensor array is used to detect color images, only one color may be detected at any given sensor location. As a result, these sensors do not produce a color image in the traditional sense, but rather a collection of individual color samples, which depend upon the assignment of color filters to individual sensors. This assignment is referred to as the color filter array (CFA) or the color mosaic pattern. To produce a true color image, with a full set of color samples (usually red, green and blue) at each sampling location, a substantial amount of computation is required to estimate the missing information, since only a single color was originally sensed at each location in the array. This operation is typically referred to as "demosaicing".

To generate the missing information, information from neighboring pixels in the image sensor must be used. In addition, some assumption must be utilized about the structure of the underlying image, since there are an infinite number of possible images that could have generated the measured color values. Typically, it is assumed that the underlying image is smooth, and an interpolation algorithm is then utilized to compute the missing color values from the neighboring measured color values.

While most images of interest to human observers are mainly smooth, the smoothness assumption is not satisfied along edges of objects and in textured regions of the image. In these regions, images generated by interpolation using the smoothness assumption show a loss of resolution. In addition, algorithms that treat the red sensors as being independent from the green sensors, and so on, typically generate color artifacts in the reconstructed images. The artifacts are incorporated in the chrominance part of the image and are due to mis-registration of the chrominance components. These artifacts express themselves as streaks of false colors in the restored image, and are especially apparent around boundaries between different objects in the image and in textured areas.

Broadly, it is the object of the present invention to provide an improved image processing method for converting data from a pixel array having non-overlapping sensors to a fully sampled digital image.

It is a further object of the present invention to provide a conversion method that does not generate the color artifacts discussed above.

It is yet another object of the present invention to provide a conversion method which has improved resolution around boundaries between objects and in textured areas.

These and other objects of the present invention will become apparent to those skilled in the art from the following detailed description of the invention and the accompanying drawings.

SUMMARY OF THE INVENTION

The present invention is a method for operating a data processing system to generate a full color image from a partially sampled version of the image. The full color image includes a first two-dimensional array of vectors. Each vector in the first two-dimensional array includes first, second, and third intensity values. Each intensity value represents the intensity of a pixel in the full color image in a corresponding spectral band at a location in the full color image determined by the location of the vector in the first two-dimensional array. The method generates the first two-dimensional array from a two-dimensional array of scalars, each scalar corresponding to one of the vectors in the first two-dimensional array. The scalar determines one of the first, second, or third intensity values at a corresponding location in the two-dimensional array of vectors. The scalars are typically the measured pixel values from a sensor array in a digital camera or the like. The method of the present invention determines the remaining ones of the first, second, and third intensity values. The method starts by assigning a value to each one of the components of the vectors in the first two-dimensional array of vectors that is not determined by one of the scalars. A luminance image and first and second chrominance images are then generated from the first two-dimensional array of vectors. Each pixel in the luminance image is determined by the intensity of light from a corresponding pixel in the first two-dimensional array, and each pixel in the first and second chrominance images representing the color of the pixel in the first two-dimensional array. The first and second chrominance images are filtered with an isotropic low-pass spatial filter to generate first and second filtered chrominance images. The two-dimensional array of vectors is then regenerated from the luminance image and the first and second filtered chrominance images. The decomposition, filtering, and regenerating steps are iterated to provide the final full-color image. At each iteration, the components of the two-dimensional array of vectors that were actually measured are reset to their measured values. In the preferred embodiment of the present invention, the luminance image is also filtered. However, the filtering of the luminance image utilizes a low-pass spatial filter having an anisotropy that varies with location in the luminance image. The regeneration step is then performed with the filtered luminance image. In the preferred embodiment of the present invention, the filtering of the luminance image is performed by first decomposing the luminance image into a plurality of component images, each component image representing information in the luminance image at different levels of scale. Each component image is then filtered with a low-pass spatial filter having an anisotropy that varies with location in the component image. The filtered component images are then recombined to generate the filtered luminance image.

DETAILED DESCRIPTION OF THE INVENTION

Figure 1:
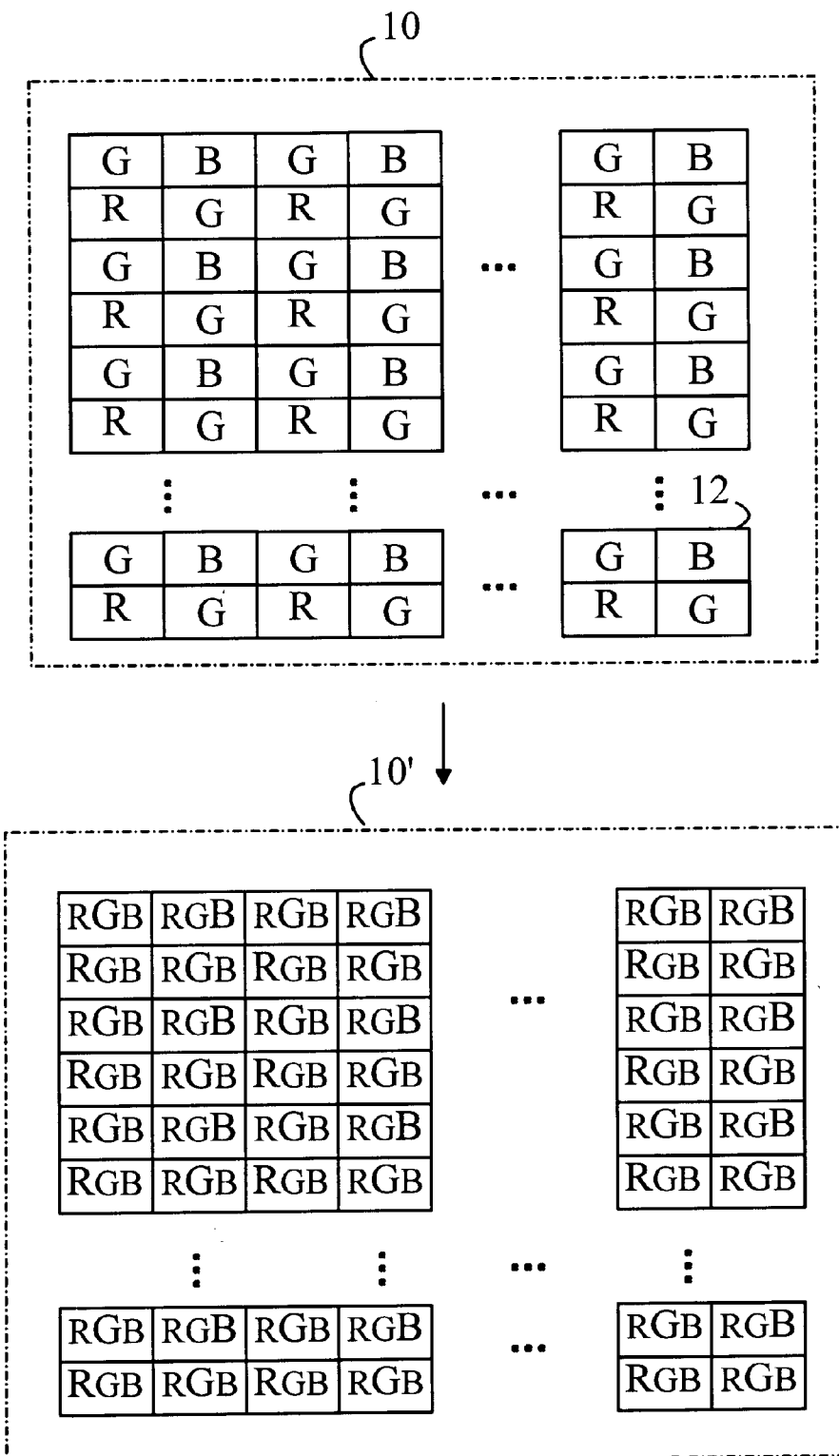
FIG. 1 illustrates the demosaicing problem as applied to a typical image taken with an image sensor having a repeating 2×2 pattern.

The method of the present invention may be applied to any color-sampling device; however, to simplify the following discussion, the method of the present invention will be explained in terms of an image sensor having a sensor pattern that is constructed by repeating a kernel of sensing elements. For example, one common image sensor array is based on the Bayer pattern which is generated by repeating a 2×2 sensor array kernel having two green sensors, one red sensor, and one blue sensor. This pattern is shown in FIG. 1 at 10. The kernel is shown at 12.

The present invention converts the data from such an array into an augmented array shown at 10' in which each pixel has intensity values representing each of three colors. In the present invention, the missing colors at each location are determined from the nearby sensor values for that color. The missing colors are shown in a smaller typeface in the figure. The individual sensor locations are assigned an address of the form (n,m), where n is the row number and m is the column number in which the sensor is located.

There are an infinite number of patterns 10' that satisfy the constraint that the measured values are as shown in 10. Hence, some additional constraints must be applied in generating the sensor values. The present invention assumes that the image is smooth except in the regions dominated by edges or texture. Consider an image having an object therein with a sharp edge. The object is assumed to be smooth near the edge. That is, if one moves through the pixels in a direction parallel to the edge, the sequence of intensity values changes smoothly. In contrast, if one moves through the pixel values in a direction perpendicular to the edge, the sequence of intensity values changes abruptly at the edge.

As stated above, there are two main problems in the reconstructed image: The color artifacts along the edges and loss of resolution due to edge smoothing. The manner in which the present invention deals with the loss of resolution due to edge smoothing will be explained first. Consider a mono-chromatic image having missing pixel values in which the missing pixel intensities are to be computed. This problem is essentially the same as the problem of computing the missing color pixels for one color without considering the pixel values from the other color sensors. The present invention assumes that the measured pixel values are not to be changed. In addition, the image is assumed to be piece-wise smooth with sharp edges.

This simplified version of the present invention operates as follows. First, a guess is provided for each of the missing pixels. For example, the missing pixel values can be initially set by interpolating the nearest four known pixels around the pixel in question. The specific method for providing the starting estimate is not critical; hence, any convenient method may be utilized.

Next, the pixels are processed one at a time as follows. First, the direction and amplitude of maximum descent in the image at the pixel being processed is determined. The simplest algorithm for making this determination utilizes a weighted sum of the differences in pixel intensity between the pixel being processed and its neighbors; however, more complex methods may be utilized. If there is an edge at the pixel in question, the edge will be perpendicular to the direction of maximum descent. The amplitude of the maximum descent determines whether an edge passes through this pixel. Hence, a 2D vector is defined for each pixel; its direction provides the edge orientation and its length the edge strength. This vector is referred to as "the dominant orientation vector" in the following discussion. The pixel in question is interpolated by computing a weighted sum of values of neighboring pixels. The weights of this sum are determined by the dominant orientation vector associated with this pixel. If the length of the dominant orientation vector is high, only pixel values along the dominant orientation are summed. If the length of the dominant orientation is low or zero (i.e.,no edge) neighboring pixel values from all adjacent pixels are summed.

After all of the image points have been processed, the pixels corresponding to the measured pixels are reset to the measured values. The process is then repeated until the difference in the successive images is below some predetermined error value.

The number of points that are used in determining the direction of maximum descent and in smoothing the image ideally depend on the scale of the objects in the image. For example, if the distance over which points are selected for the smoothing operation is too small, then insufficient smoothing will occur and the resultant image will have artifacts near the edges. If the distance is too large, structural details in the objects will be blurred. The simplified procedure described above does not measure the scale of the objects in the image, and hence, cannot provide an optimal distance, which, in general, will change with the point being processed. Therefore, it is preferable to apply the above process in a multi-scale manner but a single scale procedure as described above is also possible.

Figure 2:
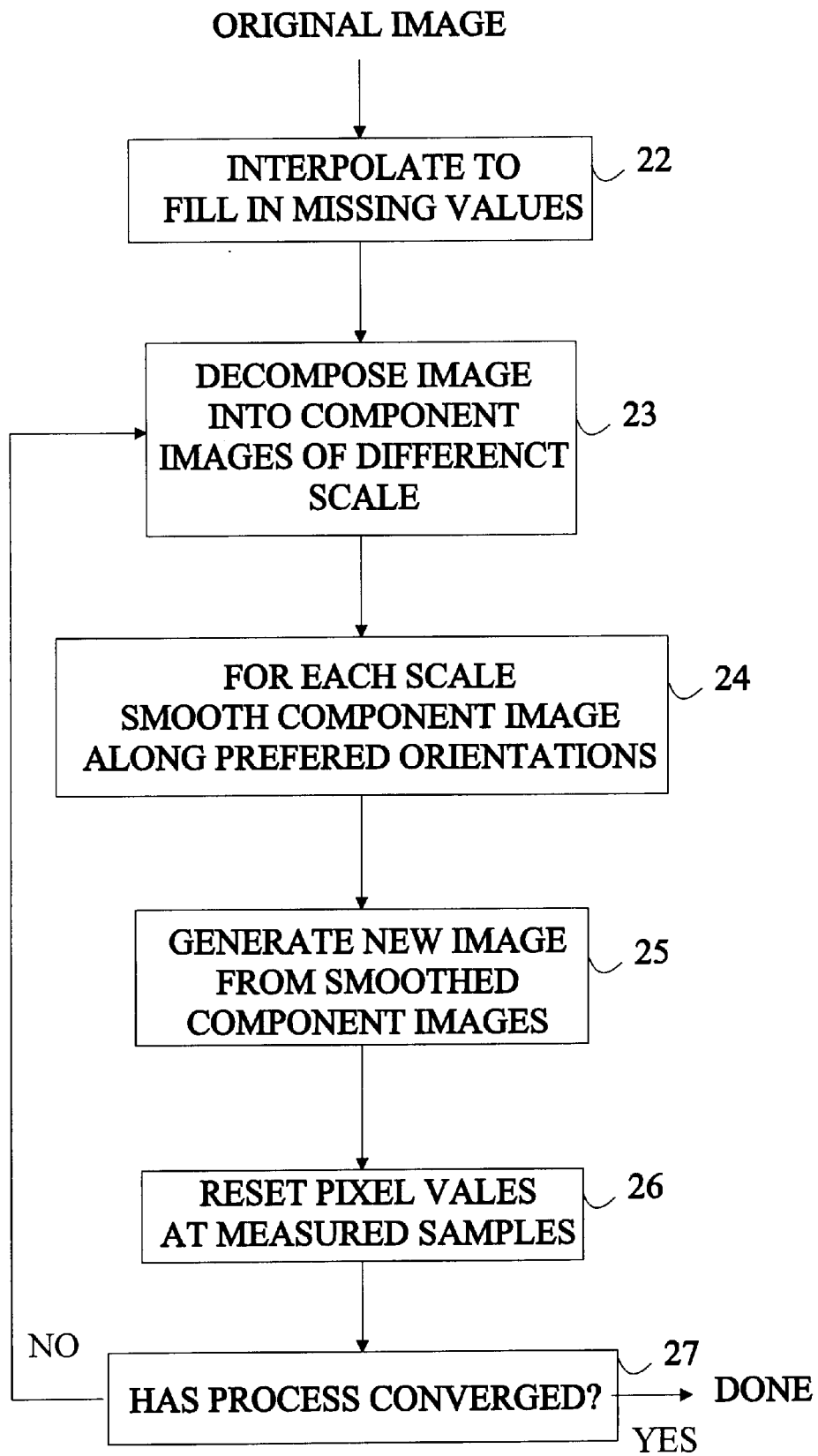
FIG. 2 is a flow chart of a method for filling in the missing pixel values in an image having a single color band according to the present invention.

Refer now to FIG. 2 which is a block diagram of a method according to the present invention for filling in the missing pixel values in an image having a single color band. The original image is first interpolated to provide starting values for the missing pixels as shown at 22. In the preferred embodiment of the present invention, the scale of the objects in the image is taken into consideration by first decomposing the image into a number of "component" images that represent the image at various levels of scale as shown at 23. The smoothing operation described above is then applied to each of the component images as shown at 24. The component images are then recombined to recover a new image as shown at 25. The pixels of the new image at the locations at which intensity values were actually measured are then reset to the measured values as shown at 26. The process is then iterated as shown at 27 until the difference in successive recovered images is below some predetermined error value.

The preferred method for decomposing the image into a plurality of component images containing details of differing scale is to generate a Laplacian pyramid. The decomposition of an image using this approach is well known in the image processing arts, and hence, will not be discussed in detail here. The reader is referred to P. J. Burt and E. H. Adelson, "The laplacian pyramid as a compact image code" IEEE Trans. Communications, 31(4):532–540, 1983, which is hereby incorporated by reference, for a detailed discussion of the method. For the purposes of this discussion, it is sufficient to note that a sequence of images is obtained from the original image as follows. The original image is first blurred by applying a Guassian blurring operator to the image. The blurred image is then subtracted from the original image to form a component image having details at the highest spatial frequencies, i.e., the smallest scale. The blurred image is then down-sampled, and the process repeated to generate a component image at the next larger scale by repeating the above-described process with the down-sampled image in place of the original image. The various component images can be combined to regenerate the original image.

The smoothing operation is applied separately at each level in the pyramid. For each pixel in a component image, a direction is defined as described above. The pixel being processed is then replaced by the result of smoothing the neighboring pixels along that direction.

After all of the component images have been smoothed, the component images are recombined to generate a new image. The pixel values at the locations at which the original image was actually measured are then reset to the measured values and the process repeated until a predetermined degree of convergence has been obtained.

The preferred method for defining the preferred orientation for the smoothing operator is steerable filters. The use of such filters to determine the local orientation of the image is well known in the image processing arts, and hence, will not be discussed in detail here. The reader is referred to W. T. Freedman E. H. Adelson, "Steerable filters for early vision, image analysis, and wavelet decomposition" in International Conf. on Computer Vision, 1990, pp. 406–415, which is hereby incorporated by reference. For the purposes of this discussion, it is sufficient to note that a set of filters can be defined that measure the "directional energy" in the image in a predetermined direction. By combining the output of the filters, the direction having the maximum energy can be determined. The maximum energy determines the "dominant orientation" vector whose length and orientation are determined according to the maximum energy value and its direction.

Denote the dominant orientation for pixel (i,j) by the vector D(i,j). The interpolated value I(i,j) for pixel (i,j) is obtained computing a weighted sum of pixels I(k,l) in a local neighborhood, N(i,j), of pixel (i,j). The weights of the sum are determined by the dominant orientation D(i,j). Pixels whose direction from (i,j) are parallel to D(i,j) are weighted higher than pixels perpendicular to D(i,j). In the preferred embodiment of the present invention, $$I(i,j) = \frac{W(k,l)I(k,l)}{\sum_{(k,l) \in N(i,j)} W(k,l)}$$

where the sum is over all pixels (k,l) in N(i,j). Here, the weights, W(k,l), are defined by:

$$W(k,l) = (1 + D(i,j) \cdot V(i,j,k,l))$$

where D·V is an inner product and V(i,j,k,l) is defined as the unit vector pointing from (i,j) towards (k,l).

The above-described embodiments of the present invention operated on a single color band. In principle, the demosaicing of a color image can be performed by applying the directional smoothing described above to each color band (red, green, and blue) separately. However, such an approach leads to color artifacts, particularly at the edges of objects, due to mis-registration in the color bands.

The color artifacts can be reduced by performing the smoothing computation in the YIQ rather than the RGB representation of the image. In the YIQ representation the Y component represents the luminance (intensity) of the image and the I and Q components represent the chrominance. The luminance-chrominance representation is an uncorrelated color representation, and hence, each color band can be treated separately. Further, the human visual system is more sensitive to high spatial frequencies in the luminance band (Y) than in the chrominance bands (IQ). In fact, in the chrominance bands, the human visual system is only sensitive to low spatial frequencies.

The YIQ representation can be computed from the RGB representation via a simple linear transformation:

$$\begin{bmatrix} Y \\ I \\ Q \end{bmatrix} = \begin{bmatrix} 0.299 & 0.587 & 0.114 \\ 0.596 & -0.274 & -0.322 \\ 0.211 & -0.253 & 0.312 \end{bmatrix} \begin{bmatrix} R \\ G \\ B \end{bmatrix}$$

Since edges, lines, and textures are composed of high frequencies, their appearance is influenced mainly by the luminance component. Accordingly, an isotropic smoothing can be provided in the chrominance bands while utilizing a directional smoothing in the luminance band. The isotropic smoothing substantially reduces the color artifacts while the directional smoothing preserves high frequency structures such as edges. In the preferred embodiment of the present invention, the isotropic smoothing is provided by smoothing I and Q bands by convolution with a Gaussian kernel. The same kernel used to generate the Laplacian pyramid may be utilized here.

Figure 3:
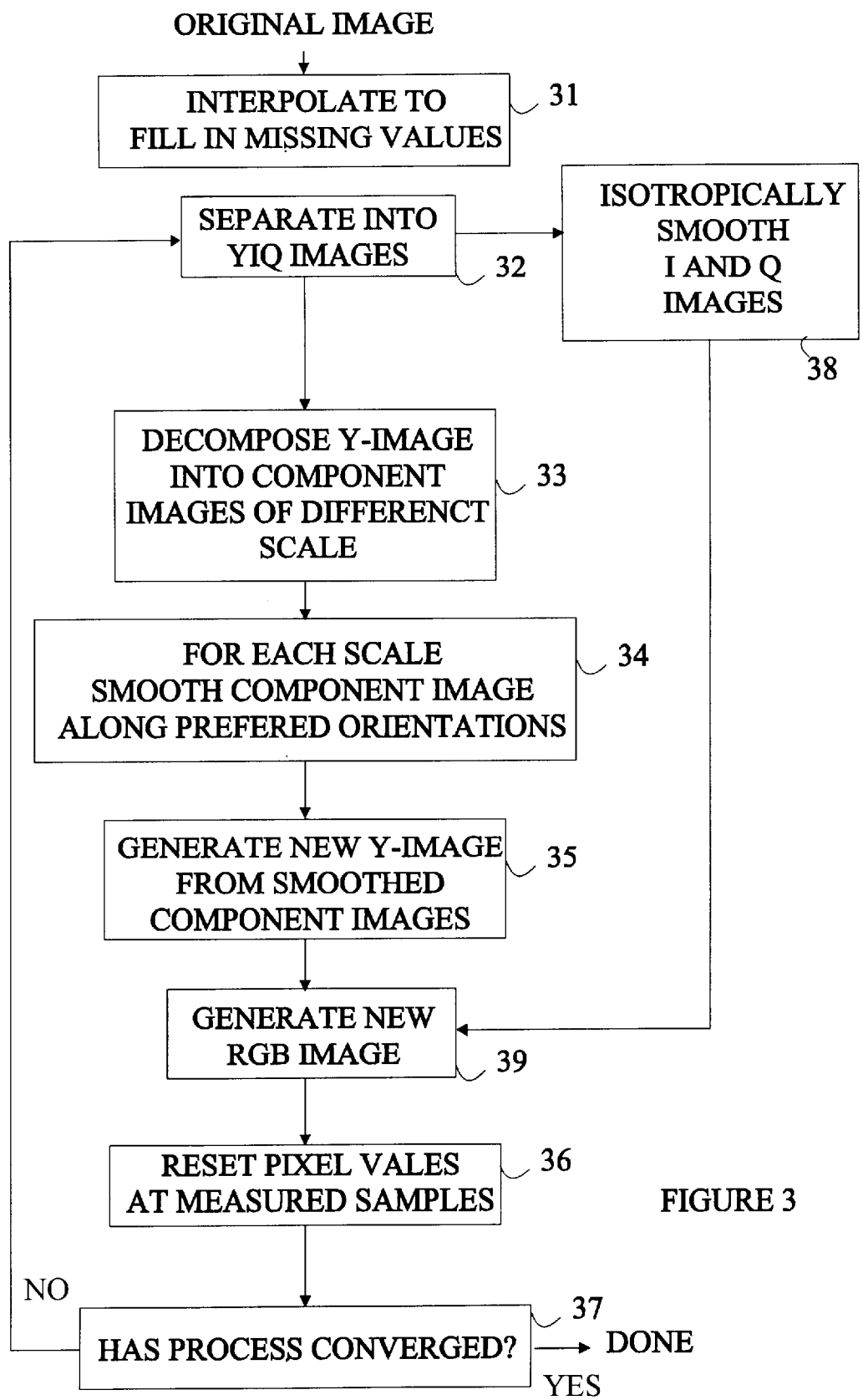
FIG. 3 is flow chart of the preferred embodiment of a demosaicing method according to the present invention.

Accordingly, the preferred embodiment of the present invention for demosaicing a color image includes two pathways as shown in FIG. 3 which is a block diagram of the preferred embodiment of a demosaicing method according to the present invention. The original image is first interpolated to provide starting values for the missing pixel intensities as shown at 31. The image is then separated into a luminance band, Y, and two chrominance bands, I and Q as shown at 38. The luminance band is directionally smoothed using the method described above or any directional smoothing known in the literature. The chrominance bands are isotropically smoothed by a convolution with a Gaussian kernel as shown at 38. The resulting values are then transformed back into the RGB representation as shown at 39. The pixel values at those locations that were actually measured in each band are then reset to their original values as shown at 36. The process is then iterated until the resulting images converge as shown at 37.

It should be noted that the use of the isotropic smoothing in the chrominance bands together with any interpolation method in the luminance band provides an improvement over current demosaicing algorithms with respect to the suppression of color artifacts at edges while preserving edge detail. The directional smoothing techniques discussed above provide improved performance in the luminance band, and hence, the preferred embodiment of the present invention utilizes both techniques.

It should be noted that the RGB to YIQ transformation and the smoothing operations are both linear operations. Accordingly, an equivalent algorithm can be generated that operates on the RGB image. Such an algorithm would eliminate the need to transform from RGB to YIQ and visa versa at each iteration, and hence, impose a reduced computational load on the computing platform on which the method of the present invention is practiced.

The present invention is preferably practiced on a general purpose computer. However, it will be obvious to those skilled in the art from the preceding discussion that the present invention can be advantageously practiced on computational platforms having special purpose hardware for reducing the computational load imposed by linear transformations.

Various modifications to the present invention will become apparent to those skilled in the art from the foregoing description and accompanying drawings. Accordingly, the present invention is to be limited solely by the scope of the following claims.

What is claimed is:

1. A method for operating a data processing system to generate a full color image comprising a first two-dimensional array of vectors, each vector in said first two-dimensional array comprising first, second, and third intensity values, each intensity value representing the intensity of a pixel in said full color image in a corresponding spectral band at a location in said full color image determined by the location of said vector in said first two-dimensional array, said method generating said first two-dimensional array of vectors from a two-dimensional array of scalars, each scalar in said two-dimensional array of scalars corresponding to one of said vectors in said first two-dimensional array of vectors, said scalar determining one of said first, second, or third intensity values at a corresponding location in said two-dimensional array of vectors, said method determining the remaining ones of said first, second, and third intensity values, said method comprising the steps of:

(a) assigning a value to each one of said components of said vectors in said first two-dimensional array of vectors that is not determined by one of said scalars;

(b) generating a luminance image and first and second chrominance images from said first two-dimensional array of vectors, each pixel in said luminance image being determined by the intensity of light from a corresponding pixel in said first two-dimensional array and each pixel in said first and second chrominance images representing the color of said pixel in said first two-dimensional array;

(c) filtering said first and second chrominance images with a isotropic low-pass spatial filter to generate first and second filtered chrominance images;

(d) generating a second two-dimensional array of vectors from said luminance image and said first and second filtered chrominance images, each vector in said second two-dimensional array comprising first, second, and third intensity values, each intensity value representing the intensity of a pixel in said full color image in a corresponding spectral band at a location in said full color image determined by the location of said vector in said first two-dimensional array;

(e) setting a component of each vector in said second two-dimensional array to said scalar value in said two-dimensional array of scalars;

(f) replacing said first two-dimensional array of vectors by said second two-dimensional array of vectors; and (g) repeating steps (b)–(f).

2. The method of claim 1 further comprising the step of filtering said luminance image with a low-pass spatial filter, said filter having an anisotropy that varies with location in said luminance image, said filtering being applied prior to generating said second two-dimensional array of vectors.

3. The method of claim 2 wherein said step of filtering said luminance image comprises the steps of:

decomposing said luminance image into a plurality of component images, each component image representing information in said luminance image at different levels of scale;

applying a low-pass spatial filter to each of said component images, said low-pass filter having an anisotropy that varies with location in said component image; and combining said filtered component images to regenerate a new luminance image, said new luminance image replacing said luminance image in steps (d)–(f).

4. The method of claim 3 wherein said step of decomposing said luminance image comprises generating a Laplacian pyramid from said luminance image.

5. The method of claim 2 wherein anisotropy of said filter is determined by the gradient of said luminance image at said location in said luminance image.

* * * * *